United States Patent
Oliva et al.

(10) Patent No.: US 7,698,618 B2
(45) Date of Patent: Apr. 13, 2010

(54) METHOD AND SYSTEM FOR CORRECTING BURST ERRORS IN COMMUNICATIONS NETWORKS, RELATED NETWORK AND COMPUTER-PROGRAM PRODUCT

(75) Inventors: Silvio Lucio Oliva, Trepuzzi (IT); Gabriella Convertino, Francavilla Fontana (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 664 days.

(21) Appl. No.: 11/397,330

(22) Filed: Apr. 4, 2006

(65) Prior Publication Data

US 2006/0253763 A1    Nov. 9, 2006

(30) Foreign Application Priority Data

Apr. 4, 2005    (IT)    ............... TO2005A0221

(51) Int. Cl.
*H03M 13/00*    (2006.01)
(52) U.S. Cl. ............... 714/752; 714/755; 714/758; 714/774; 714/781
(58) Field of Classification Search ............... 714/752, 714/755, 758, 774, 781; 370/514
See application file for complete search history.

(56) References Cited

U.S. PATENT DOCUMENTS

| | | | |
|---|---|---|---|
| 5,181,207 A | | 1/1993 | Chapman |
| 5,699,365 A | | 12/1997 | Klayman et al. |
| 5,870,412 A | * | 2/1999 | Schuster et al. ............... 714/752 |
| 6,145,109 A | * | 11/2000 | Schuster et al. ............... 714/752 |
| 6,226,769 B1 | * | 5/2001 | Schuster et al. ............... 714/752 |
| 6,741,569 B1 | | 5/2004 | Clark |
| 2004/0015765 A1 | | 1/2004 | Cooper et al. |

FOREIGN PATENT DOCUMENTS

| | | |
|---|---|---|
| CA | 2430218 A1 | 6/2002 |
| WO | 2004040831 A1 | 5/2004 |
| WO | 2005040831 A1 | 5/2005 |

OTHER PUBLICATIONS

Bolot, J-C., et al., "Adaptive FEC-Based Error Control for Internet Telephony," in *Proceedings of the 18th Annual Joint Conference of the IEEE Computer and Communications Societies*, New York, Mar. 21-25, 1999, pp. 1453-1460.

(Continued)

*Primary Examiner*—Sam Rizk
(74) *Attorney, Agent, or Firm*—Lisa K. Jorgenson; Robert Iannucci; Seed IP Law Group

(57) ABSTRACT

The errors that may occur in transmitted numerical data on a channel affected by burst errors, are corrected via the operations of: ordering the numerical data in blocks each comprising a definite number of data packets; generating for each block a respective set of error-correction packets comprising a respective number of correction packets, the respective number identifying a level of redundancy for correcting the errors; and modifying dynamically the level of redundancy according to the characteristics of the bursts and of the correct-reception intervals between two bursts. Preferential application is on local networks, such as W-LANs for use in the domestic environments.

31 Claims, 4 Drawing Sheets

OTHER PUBLICATIONS

Friedman, T., et al., "RTP Control Protocol Extended Reports (RTCP XR)," *Internet Engineering Task Force*, 55 pages, Nov. 2003.

Frossard, P., et al., "FEC Performance in Multimedia Streaming," IEEE Communications Letters, 5(3):122-124, Mar. 2001.

Nafaa, A., et al., "Joint Loss Pattern Characterization and Unequal Interleaved FEC Protection for Robust H.264 video Distribution over Wireless LAN," *Computer Networks 49*:766-786, 2005.

Wah, L., et al., "Adaptive Bandwidth-Constrained Media-Specific Forward Error Correction for Voice Over Internet Protocol," in *Proceedings of the 10th IEEE Int'l Conference on Networks*, Piscataway, NJ, Aug. 27, 2002, pp. 455-460.

Yuk, S-W., et al., "Adaptive Redundancy Control for Systematic Erasure Code Based Real Time Data Transmission in Internet," in *Proceedings of the IEEE Int'l. Conference on Communications*, New York, Jun. 18-22, 2000, pp. 1769-1773.

Schulzrinne, H., et al., "RTP: A Transport Protocol for Real-Time Applications," Network Working Group, Request for Comments: 3550, The Internet Society, Jul. 2003, retrieved on Feb. 5, 2009, from http://www.ietf.org/rfc/rfc3550.txt?number=3550, 87 pages.

* cited by examiner

METHOD AND SYSTEM FOR CORRECTING BURST ERRORS IN COMMUNICATIONS NETWORKS, RELATED NETWORK AND COMPUTER-PROGRAM PRODUCT

BACKGROUND OF THE INVENTION

1. Field of the Invention

The present invention relates to techniques that enable correction of burst errors in communications networks.

In a specific way, the invention relates to techniques for modifying dynamically the level of redundancy for forward error correction(FEC) on the basis of the conditions of noise on the channel.

The invention has been developed with particular attention paid to its possible use in wireless local-area networks (WLANs), but can be applied to all communications networks that may be exposed to loss of information (loss-prone networks).

2. Description of the Related Art

The growing number of applications that use transport protocols of an unreliable type, such as the UDP (unreliable datagram protocol), renders necessary the adoption of techniques for the recovery of the lost packets to obtain error-resistant transmissions, above all in the case where the transmission occurs on error-prone communications networks, such as for example wireless networks.

An excessive packet-loss rate can very markedly reduce the quality of the received data. One of the techniques for recovery of lost packets (which preserves the quality of the data) uses the Reed-Solomon (RS) error-correction code. This technique envisages the generation of (n−k) redundant packets (FEC packets) for each block of k packets of transmitted data. The FEC packets are transmitted together with the data flow in order to protect the received data from losses. This type of solution enables protection of the data of up to a maximum of (n−k) lost packets every n packets transmitted.

The disadvantages in the use of this technique regard optimal assignment of the parameters n and k for error correction. The parameters can be chosen so as to maximize efficiency in terms of useful data using an error correction that is precise to the point of compensating exactly the level of loss and nothing else.

It is hence necessary to reach a balance between the amount of information added by the error-correction code (which uses bandwidths that could be used for useful data and thus causes reduction in the efficiency of transmission of the data) and the minimum amount of error-correction packets necessary on the basis of the conditions of the channel (which can be useful to increase the efficiency of transmission of the data, avoiding retransmissions).

Strictly connected to the above disadvantages is the problem of the distribution of the recurrences (occurrences) of the lost packets. In effect, a loss model can have a more or less important effect on the resulting distortion at the receiver end, and hence accurate models for forecasting losses may represent a valid aid for minimizing the resulting distortion.

In particular, burst losses have a given recurrence on loss-prone networks, particularly wireless networks, and generally cannot be easily or completely recovered. In the presence of burst errors, the techniques based upon the simple calculation of the mean packet error rate (PER) are those that afford the worst performance.

FEC packets generated by error-correction codes, such as the Reed-Solomon code, on account of their capacity for recovering more than one packets in a data block, are a good tool against burst distribution of losses.

In the presence of burst losses, the FEC packets can be more effective if they are used together with an interleaving technique.

Interleaving techniques enable random burst losses to be more sparse within the data flow and are based on the solution of transmitting the packets not in their sequential order but according to a different order, defined by a pre-set law. An example of pre-defined order is the one shown in FIG. 1.

In particular, in FIG. 1 first all the packets "pck0" of the t blocks are transmitted in order starting from the packet "pck0" of block "0" up to the packet "pck0" of block "t−1", then all the packets "pck1" are transmitted always in the same order, and so on up to the packets "pck(k−1)". After the k packets of all the t blocks have been transmitted, the n FEC packets are transmitted once again in the same order.

The number of blocks designed to be interleaved is chosen taking into account the need to render sparse the errors and respecting constraints in terms of decoding delay, which are particularly important for real-time applications (before starting the operation of decoding, all the blocks involved in interleaving must have been received).

The problem can be reduced to the operation of finding the optimal values for the following parameters:

- number k of data packets to be protected with the FEC packets;
- number (n−k) of FEC packets that protect the k data packets computed at the previous step; and
- depth of interleaving (understood as the number of blocks that are involved in interleaving).

The purpose of the above procedure is to enable maximization of the efficiency of transmission of the useful data and minimization of the residual losses (losses of the data packets) at the receiver end.

Various known methods for providing error correction typically supply a fixed number of FEC packets, without considering the expedience of increasing/decreasing the efficiency of transmission on the basis of detection of variations in the condition of congestion or noise on the channel.

Other known solutions propose a dynamic modification of the percentage of packets that are introduced for correcting transmission errors. The majority of these solutions do not prove, however, suitable for modelling and exploiting the measurement of the level of burstiness of the error model to improve protection in regard to errors. The mean packet error rate by itself is not a good reference parameter for representing the actual characteristics of the error model because, in the presence of burst losses, the mean packet error rate is usually much lower than the burst packet error rate.

The example of FIG. 2 shows a model that comprises 64 packets, in which a "1" denotes a packet that has been received, a "0" denotes a lost packet, and an "X" denotes a rejected packet.

The burst consists of the twelve packets designated in FIG. 2 by the reference "burst" that starts with a rejected packet X and ends with a lost packet 0. The first correct-reception interval, designated by "gap", begins at the start of the session, and the second correct-reception interval terminates at the end of transmission. Half-way between the two correct-reception intervals there is precisely the burst-error interval designated by "burst".

The parameter Gmin is the minimum distance in the received packets between two lost/rejected packets so that a loss can be considered as belonging to a correct-reception interval.

For example, if the parameter Gmin is adjusted at the value 16, the burst density is 0.33 (4 lost or rejected packets divided by the total number of 12 expected packets) and the density of the correct-reception interval is 0.04 (2 lost or rejected packets divided by the total number of 52 expected packets). Consequently, the loss rate is 9.4%.

As has been said, FIG. 2 provides a real trace of the errors, where "1" means that the packet has been received and "0" that the packet has been lost. The mean PER (calculated dividing the sum of the lost and/or rejected packets by the total number of expected packets) is 9.4%. Introduction of a FEC only on the basis of this parameter will render non-recoverable all the losses in the burst interval (i.e., 33% of the expected packets). On the other hand, the FEC introduced in the correct-reception interval is useless.

Other known solutions propose dynamic methods for flexible adaptation of the error-correction capacity for recovering the lost packets and simultaneously adapting the data rate in such a way as not to increase the total data rate, applying a number of FEC packets. These methods are usually based upon the responses transmitted by the receiver to the transmitter.

As regards specifically the patent literature, the document U.S. Pat. No. 5,699,365 describes a method and an apparatus for adaptive forward error correction in data-communication systems. This solution envisages dynamic variation of the error-correction parameters on the basis of the conditions of the communication channel, as well as the level of noise and the error rate.

In the method proposed in the document U.S. Pat. No. 5,699,365, data are received, which have a current degree of forward error correction, and a channel parameter is controlled, such as, for example, the bit error rate or packet error rate. A threshold level is moreover defined for the channel parameter, and the channel parameter controlled is compared with said threshold level. When the channel parameter does not fall within a pre-set or adaptable range of variance of the threshold level, a new modified parameter of forward error correction is selected, which has a higher or lower degree of capacity for forward error correction. This modified error-correction parameter is transmitted on the channel. The device that receives the modified error-correction parameter transmits the data encoded using the new modified error-correction parameter.

The document WO-A-2004/040831 describes a solution applied to packet-transmission networks. An adaptive scheme of error control performed at the application level is proposed, at the same time enabling a maximum tolerated packet error rate to be respected. According to the scheme proposed, the amount of redundancy is adapted so as to afford a possibility of error correction enabling the maximum tolerated error rate to be respected. The maximum tolerated error rate is established by the particular application.

The document CA 2 430 218 describes an adaptive error-correction technique based upon the noise bursts in which the rate of occurrence of these bursts is measured. The error-correction parameters are determined using statistics that describe the duration and period of the noise bursts. The occurrences, duration and period of the noise bursts are determined by the length of the error vector calculated during the decoding process.

The document U.S. Pat. No. 5,181,207 describes a mechanism for correcting errors in a digital data stream encoded by the transmitter and transmitted on a communication channel to a receiver and decoded by the receiver for recovering the digital data pre-encoded using a parity encoder. The position of the errors is determined by an operation of comparison, on the basis of which the receiver can generate a mask of the model of the errors in the received digital data stream. This mask of the error model is used in an preventive iterative error-correction process for identifying the position of the burst errors contained in the data recovered and for modifying the output of the host decoder of the receiver in a controllable way so as to eliminate the errors identified from the data originally decoded.

The document U.S. Pat. No. 2004/015765 describes an adaptable and dynamic scheme of error correction for a communication channel. The method calculates the real bit error rate in order to make a comparison with a reference bit error rate. When a channel provides a performance better than the required performance, the power of forward error correction can be reduced in order to provide a better efficiency. If the real bit error rate calculated is higher than the reference bit error rate, then the power of error correction is increased in an attempt to reduce the bit error rate. A feedback loop is used for continuous calculation of the modified bit error rates whilst the power of error correction is increased or decreased.

The document U.S. Pat. No. 6,741,569 describes a subjective quality-control system for multimedia-signal packet-transmission systems that evaluates the parameters of a statistical model that represents the probability of the packet-transmission system that is in a condition of low losses or in a condition of high losses and uses said evaluations of the parameters for predicting the subjective quality of the multimedia signal. The quality-control system contains a plurality of quality-control functions located in the point of conversion between multimedia signal and packet.

BRIEF SUMMARY OF THE INVENTION

From the foregoing description of the current situation, it emerges that there exists the need to define solutions capable of treating, in a more satisfactory way, burst error correction in communications networks.

The object of the present invention is to meet the aforesaid need.

In accordance with the present invention, the above object is achieved by a method having the characteristics recalled in the claims that follow. The present invention also relates to a corresponding system, a network comprising said system, as well as a computer-program product, loadable into the memory of at least one computer and comprising software code portions for implementing the aforesaid method. As used herein, the reference to such a "computer-program product" is to be understood as being equivalent to the reference to a medium that can be read by a computer and contains instructions for controlling a computer system in order to co-ordinate execution of the method according to the invention. The reference to "at least one computer" is aimed at highlighting the possibility for the present invention to be implemented in a distributed and/or modular way.

The annexed claims form an integral part of the disclosure of the invention provided herein.

Basically, the solution described herein uses detailed information on the description of the error model (see, for example, the document "RTP Control Protocol Extended Reports (RTCP XR)" Network Working Group RFC 3611, available on line at the date of filing of the present application on the web site at the address www.ietf.org/rfc/rfc3611.txt?number=3611) and defines the method for using this information in order to derive the percentage of FEC packets and the interleaving factor.

In the currently preferred embodiment, the solution described herein is based upon the information transmitted from the receiver to the transmitter. The information includes the mean packet error rate (PER) but also some supplementary statistical information that aims at characterizing the loss model better in terms of length and recurrence of the burst losses. The transmitter uses all the statistical information for calculating the best level of protection to apply.

BRIEF DESCRIPTION OF THE SEVERAL VIEWS OF THE DRAWINGS

The invention will now be described, by way of non-limiting example, with reference to the annexed figures of drawing, wherein.

DETAILED DESCRIPTION OF THE INVENTION

Figure 1:
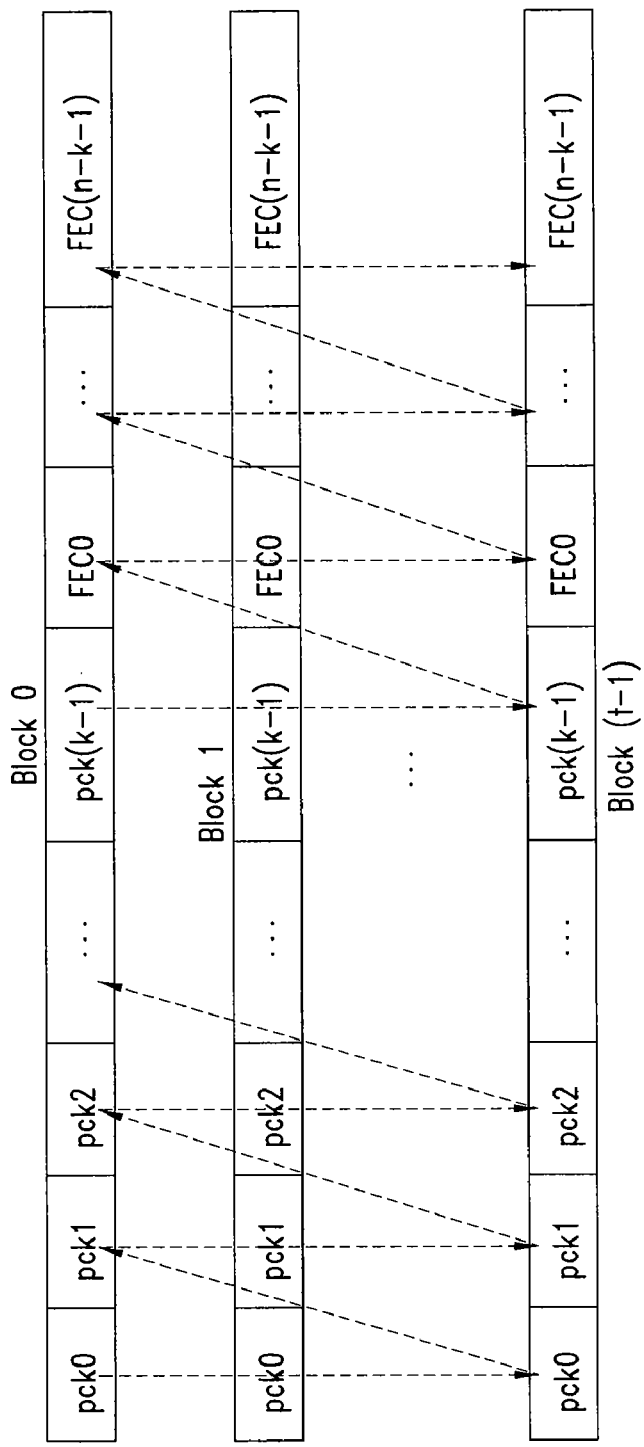
FIGS. 1 and 2, referring to the prior art, have already been described previously.
Figure 2:
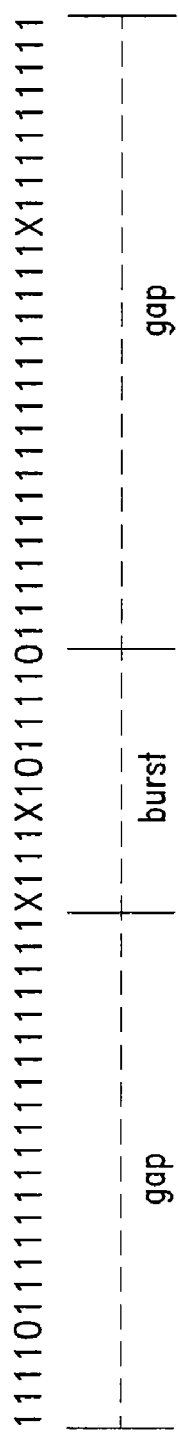
Figure 3:
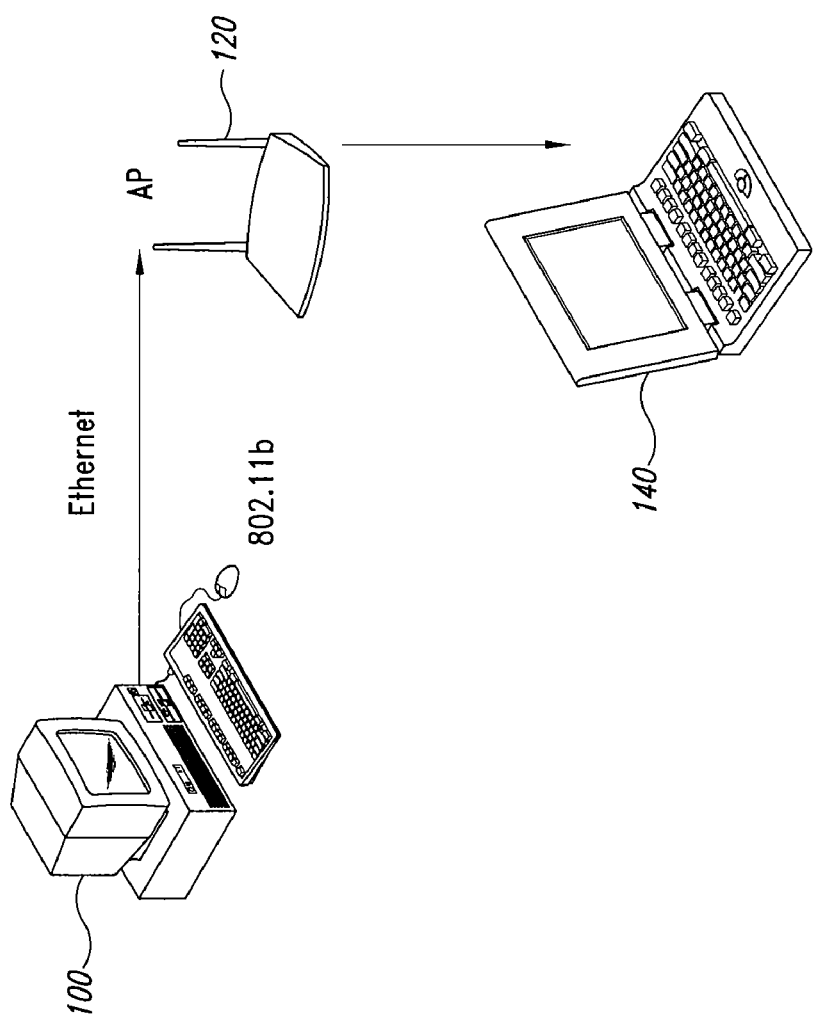
FIG. 3 shows an example of a domestic scenario of application of the solution described herein.

For reasons of simplicity and as typical example of application of the proposed solution, the domestic scenario of continuous flow of packet data shown in FIG. 3 is considered, in which a user or client 140 wishes to receive a video program (stream) from a server 100 through an access point 120 and by means of a wireless card, for example of the 802.11x type. The variations in conditions of the wireless connection in this typical domestic environment, due to the effect of propagation or interference of traffic generated by other devices present, may cause the loss of some packets (it is possible to consider another PC in the same home that has access to the Internet via the same server and through the same access point).

A way for controlling the quality of the transmission and of the connection is provided by the statistical information signalled by a control protocol, such as for example RTCP (Real-Time Transfer Control Protocol), in the periodic responses that the receiver sends to the transmitter. In particular, as for example in the solution described herein, it is possible to consider more detailed metrics, such as the ones defined in the document "RTP Control Protocol Extended Reports (RTCP XR)" Network Working Group RFC 3611. These metrics are to be considered supplementary with respect to the ones envisaged of the normal RTCP report.

Figure 4:
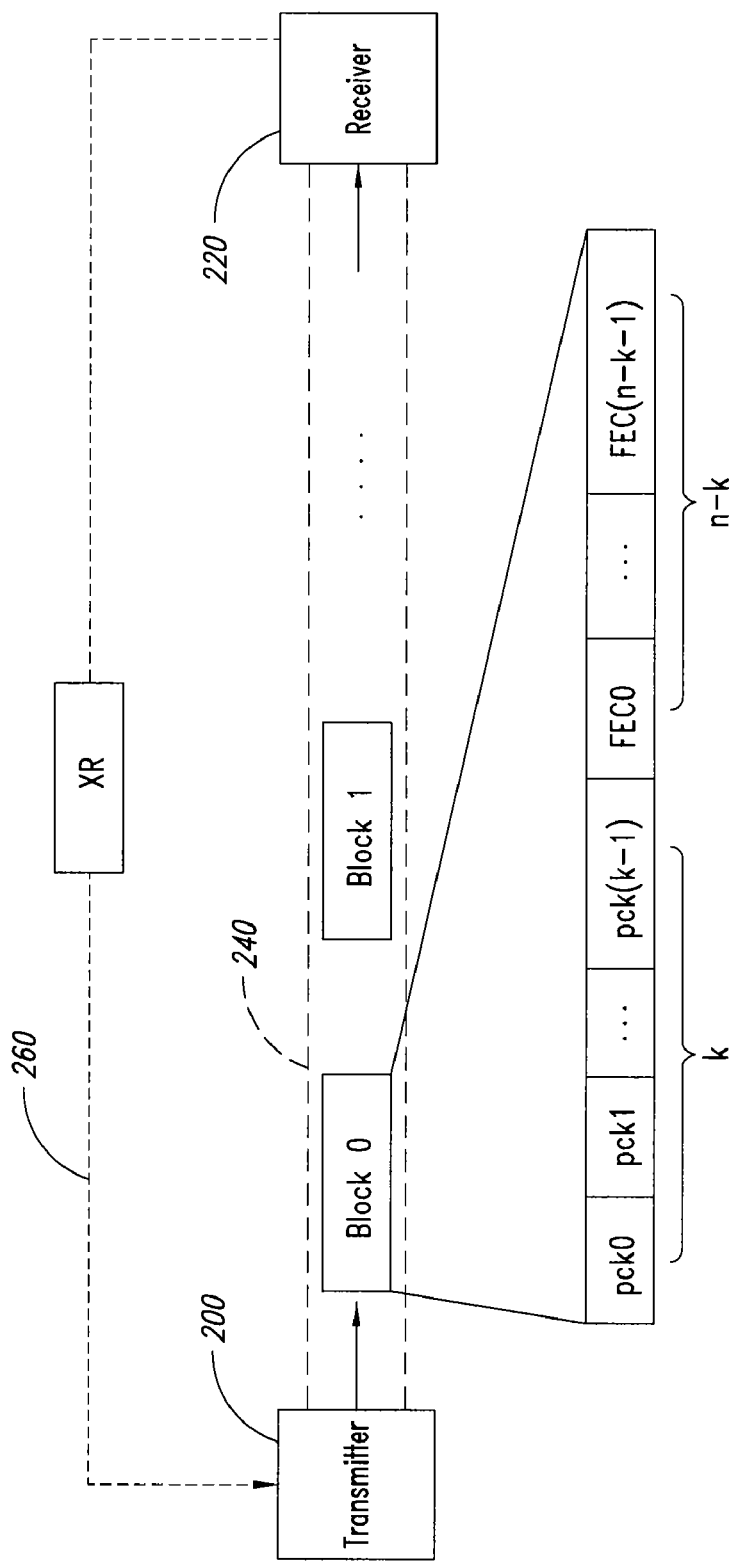
FIG. 4 shows an example of transmission on a communications network in the framework of the present invention.

FIG. 4 shows an example of transmission, on a communications network based upon a real-time protocol (such as RTP), between a transmitter 200 and a receiver 220 by means of a communication channel 240.

The transmission channel 240 is prone to loss of information. On the channel 240 blocks of data (Block 0, Block 1 . . . ) are sent, each of which contains the k data packets to be transmitted (pck0, pck1, . . . pck(k−1)) and the (n−k) error-correction packets (FEC0, FEC1, . . . FEC(n−k−1)). At pre-set intervals, the receiver 220 sends to the transmitter 200 periodic responses 260 containing information and metrics on the transmission by means of the extended reports (XRs).

The document RFC 3611 defines statistics capable of describing in a very detailed way the losses that have occurred during a period of observation between two successive report blocks: the losses are described not only in terms of mean PER, but also in terms of length of the burst, length of the correct-reception interval, and density (where a burst is a period during which the rate of loss/rejection of packets is large enough to cause of a considerable degradation of quality, whilst a correct-reception interval is a period during which there is a rare occurrence lost/rejected packets, and hence the resulting quality is generally very good).

The main idea of the solution described herein is the definition of a method that uses the characteristics of the bursts and of the correct-reception interval as parameters for identifying optimal values for the parameters k and (n−k) of forward error correction to maximize the efficiency of transmission of the data and minimize the residual losses.

The sequel of the present description makes express reference to some parameters appearing in RTP documents, such as:

"A Transport Protocol for Real-Time Applications", Network Working Group RFC 3550, www.ietf.org/rfc/rfc3550.txt?number=3550; and "RTP Control Protocol Extended Reports (RTCP XR)", Network Working Group RFC 3611, www.ietf.org/rfc/rfc3611.txt?number=3611.

The first of the aforesaid parameters is the PER. The packet error rate or the rate of loss of the packet is perhaps the simplest metrics that can be computed to evaluate the conditions of transmission. If the interval between two reception reports is considered, the difference in the cumulative number of lost packets gives the number of lost packets during the interval. The difference in the progressive numbers between the last packets of two successive reception reports yields the number of packets expected during the interval. The ratio of these two values (lost packets and expected packets) is the fraction of loss of packets over the interval. This ratio is equal to the fraction of lost packets only if the two reception reports are successive; otherwise it is not. Furthermore, the duplicated packets will not be counted as received packets, whereas the packets will be counted as lost if they are rejected on account of delayed arrival.

Another parameter is the so-called burst length. As used herein "burst" means a sequence of packets that has the following characteristics:

i) it starts with a lost or rejected packet;

ii) it does not contain any occurrence of Gmin consecutively received packets (where Gmin is the minimum distance in received packets between two lost/rejected packets so that a loss can be considered to belong to a correct-reception interval);

iii) it concludes with a lost or rejected packet.

Another parameter is then represented by the correct-reception interval or "gap". The correct-reception interval is defined as a period with low packet losses and/or rejects (i.e., the period of time of correct reception between two bursts).

The bursts and the correct-reception intervals are characterized by a density. The burst density is the fraction of data packets that have been lost or rejected during the burst period from the start of reception. The density of the correct-reception interval is the fraction of the data packets that have been lost or rejected within the correct-reception intervals between successive bursts from the start of reception.

The following parameters are moreover defined:

k as output_par->data (number of data packets to be protected with the FEC packets);

(n−k) as output_par->redundancy (number of FEC packets that protect the k data packets);

output_par->rate as new rate at which the application must encode the new data once the parameters output_par->data and output_par->redundancy have been computed;

output_par->interleaving as interleaving depth;

xr->burst_length, xr->burst_density, xr->g_min e xr->gap_length, as metrics signalled (in mean values) by the extended reports; and input_par->startrate as index of initial encoding of the application.

The solution proposed herein enables determination of the optimal values for the FEC parameters in the following way:

the number of data packets to be protected by means of the FEC packets (the k data in a block, output_par->data) is computed as the sum of the mean burst length and of Gmin minus the mean number of effective losses in a burst (errors_in_burst), then the number of FEC packets (the redundancy, output_par->redundancy) is adjusted at the same value as the parameter errors_in_burst.

The above operations can be translated into the following pseudo-code:

```
data = xr->burst_length + xr->g_min
loss_rate = xr->burst_density
errors_in_burst=xr->burst_length*xr->burst_density/100
output_par->rate=input_par->startrate*(1-loss_rate/100)
output_par->data = data - errors_in_burst
output_par->redundancy = errors_in_burst
```

Calculation of a new value for the output_par->rate parameter is necessary in order not to exceed the available bandwidth. Furthermore, the value of the length of the correct-reception interval plus the length of the burst can be used for fixing the interleaving depth, as indicated in what follows:

output_par->interleaving=(xr->gap_length+xr->burst_length)/ xr->burst_length;

The advantage provided by the solution described herein is representing by the fact that good (if not excellent) values are achieved for the number k of data packets in a block, for the number (n−k) of FEC packets, and for the number of packets to be interleaved, proceeding not by trial-and-error, as in the case of decisions based upon the packet error rate (PER), but following upon application of a rule.

A confirmation of the advantages afforded by the solution described herein is provided by simulations obtained using data streams that present a loss model obtained from transmission on LAN wireless networks. A transmission data stream (duration 125 sec) is considered, during which there has been detected a mean packet error rate of approximately 18.3%. The first test, the results of which are given in what follows, is an evaluation of the reduction of the losses (in terms of residual losses, i.e., of data packets lost) when (n−k) FEC packets are applied to blocks each with k packets.

The value n is a fixed parameter, such as the interleaving depth, whilst (n−k) is computed dynamically with respect to the rate of losses or "loss_rate" (PER) signalled periodically in the response reports.

The number (n−k) of FEC packets is computed according to the following rules:

if the loss rate is 0<loss_rate<3%, then no action is taken;
if the loss rate is 3%<=loss_rate<10%, then, in a block of n packets, 10% are FEC packets;
if the loss rate is 10%<=loss_rate<20%, then, in a block of n packets, 20% are FEC packets;
if the loss rate is 20%<=loss_rate<30%, then, in a block of n packets, 30% are FEC packets;
if the loss rate is 30%<=loss_rate<40%, then, in a block of n packets, 40% are FEC packets; and so forth.

The duration of the period monitored, starting from a value of 500 ms, changes on the basis of the time necessary for the complete reception of the packets comprised in an interleaving block. The results presented in Table 1 show the average residual losses obtained applying said rules and varying the interleaving parameter depth.

On account of constraints on the decoding delay (30 packets per block and 30 blocks per interleaving depth means that there is to be expected the reception of 900 packets before start of decoding), as best value may be considered the value of the residual data losses in the last row and column in Table 1 appearing below. It should be noted that this value has been obtained after a given number of attempts.

TABLE 1

| Length | n | Loss rate (%) | Data-block length (k) | Redundancy (%) | Interleaving depth | Residual losses |
|---|---|---|---|---|---|---|
| 125 sec | 10 | 16.05 | 7.62 | 23.78 | — | 11.943 |
| 125 sec | 20 | 16.05 | 15.72 | 21.19 | — | 12.15 |
| 125 sec | 30 | 16.05 | 23.79 | 20.43 | — | 11.73 |
| 125 sec | 30 | 16.05 | 23.78 | 20.48 | 2 | 10.46 |
| 125 sec | 30 | 16.05 | 23.77 | 20.51 | 3 | 10.27 |
| 125 sec | 30 | 16.05 | 23.69 | 20.61 | 5 | 9.528 |
| 125 sec | 30 | 16.05 | 23.73 | 20.61 | 7 | 10.04 |
| 125 sec | 30 | 16.05 | 23.7 | 20.6 | 9 | 9.63 |
| 125 sec | 30 | 16.05 | 23.65 | 20.71 | 11 | 9.1 |
| 125 sec | 30 | 16.05 | 23.6 | 20.71 | 15 | 9.71 |
| 125 sec | 30 | 16.05 | 23.57 | 20.61 | 20 | 9.53 |
| 125 sec | 30 | 16.05 | 23.4 | 20.75 | 30 | 8.38 |

Applying the solution described herein to assign in an optimal way the number of FEC packets and the interleaving parameters on the basis of the same percentage of redundancy, almost the same optimal value for the residual losses can be obtained, as shown by the results given in Table 3.

In order to render homogeneous the comparison between the data appearing in Table 1 and Table 3, the best case has been given again in Table 1 (obtained for n=30 and interleaving parameter equal to 30) using a period for the response reports fixed at 2700 ms. The same value has been used for the test in Table 3.

TABLE 2

| Length | Period monitored | Loss rate (%) | Redundancy (%) | Residual losses (%) |
|---|---|---|---|---|
| 90 sec | 2700 ms | 18.29 | 19.52 | 7.92 |

As may be noted from Table 3, in the case where the number of FEC packets and the interleaving parameter are dynamic and calculated as proposed in this patent, values of residual losses very close to those of the optimal case given in Table 2 are obtained.

TABLE 3

| Length | Period monitored | Loss rate (%) | Redundancy (%) | Residual losses (%) |
|---|---|---|---|---|
| 90 sec | 2700 ms | 18.29 | 19.61 | 8.54 |

In conclusion, the experimental data confirm that the use of the metric provided by RTCP XR (in particular, as regards the density of the bursts and the length of the correct-reception intervals) and the adoption of this method is a good solution in order to arrive, by means of a rule (and hence not by means of attempts), at the optimal values for the parameters k and (n−k) and at the value of interleaving depth for maximizing the efficiency of the data and minimizing the data losses.

Consequently, without prejudice the principle of the invention, the details of implementation and the embodiments may vary, even significantly, with respect to what is described and illustrated herein purely by way of non-limiting example, without thereby departing from the scope of the invention, as defined by the ensuing claims.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

The invention claimed is:

1. A method, comprising:
correcting burst errors in a transmission of numerical data in a communications network that includes a transmitter computing device, the correcting including:
ordering said numerical data in blocks each comprising a definite number of data packets;
generating for each of said blocks a respective set of error-correction packets comprising a respective number of correction packets, said respective number identifying a level of redundancy for correcting the errors;
modifying dynamically said level of redundancy according to characteristics of bursts and of correct-reception intervals between two of said bursts; and
identifying said bursts as sequences of packets having the following characteristics:
i) they start with a lost packet or rejected packet;
ii) they do not contain any occurrence of a given number of consecutively received packets;
iii) they conclude with a lost packet or rejected packet.

2. The method according to claim 1, further comprising generating said set of error-correction packets as set of forward-error correction packets.

3. The method according to claim 1, further comprising identifying said given number as the minimum distance in received packets between two lost or rejected packets so that a loss can be considered as belonging to a correct-reception interval.

4. The method according to claim 1, further comprising:
determining said definite number of data packets as a sum of a mean length of said bursts and of said given number of consecutively received packets minus a mean number of losses of packets in a burst, so that said respective number of correction packets is adjusted based on said mean number of losses of packets in a burst.

5. The method according to claim 4, further comprising determining said respective number of correction packets in a way proportional to a packet error rate.

6. The method according to claim 5, further comprising determining said respective number of correction packets according to the following rules:
when the packet error rate is lower than a given threshold, error-correction packets are not added;
when the packet error rate is comprised between two percentage values A and B, with B>A, in a block of n packets, B % error-correction packets are added.

7. The method according to claim 1, further comprising:
subjecting said data packets to interleaving; and
determining an interleaving depth as a sum of a length of the correct-reception interval and a burst length divided by the burst length.

8. A method, comprising:
correcting burst errors in a transmission of numerical data in a communications network that includes a transmitter computing device, the correcting including:
ordering said numerical data in blocks each comprising a definite number of data packets;
generating for each of said blocks a respective set of error-correction packets comprising a respective number of correction packets, said respective number identifying a level of redundancy for correcting the errors; and
modifying dynamically said level of redundancy according to characteristics of bursts and of correct-reception intervals between two of said bursts,
wherein the modifying operation includes modifying dynamically said level of redundancy according to at least one parameter chosen between;
a density of said bursts, defined as fraction of lost or rejected data packets during the bursts; and
a density of said correct-reception intervals, defined as fraction of lost or rejected data packets within correct-reception intervals between successive bursts.

9. A method, comprising:
correcting burst errors in a transmission of numerical data in a communications network that includes a transmitter computing device, the correcting including:
ordering said numerical data in blocks each comprising a definite number of data packets;
generating for each of said blocks a respective set of error-correction packets comprising a respective number of correction packets, said respective number identifying a level of redundancy for correcting the errors; and
modifying dynamically said level of redundancy according to characteristics of bursts and of correct-reception intervals between two of said bursts,
wherein the modifying operation includes modifying dynamically said level of redundancy according to a packet error rate, defined as a ratio between a total number of lost packets and a total number of expected packets for transmission in a given time interval.

10. The method according to claim 9, further comprising:
generating, at time intervals, transmission reports of said packets; and
detecting a difference in a cumulative number of lost packets as a number of lost packets during one of said time intervals.

11. The method according to claim 9, further comprising:
generating, at time intervals, transmission reports of said packets; and
detecting a difference in progressive numbers between the last packets of two successive reports as the number of expected packets during the interval.

12. A method, comprising:
correcting burst errors in a transmission of numerical data in a communications network that includes a transmitter computing device, the correcting including:
ordering said numerical data in blocks each comprising a definite number of data packets;
generating for each of said blocks a respective set of error-correction packets comprising a respective number of correction packets, said respective number identifying a level of redundancy for correcting the errors;
modifying dynamically said level of redundancy according to characteristics of bursts and of correct-reception intervals between two of said bursts;
duplicating at least some of said packets for transmission; and
not counting the duplicated packets as received packets.

13. A method, comprising:
correcting burst errors in a transmission of numerical data in a communications network that includes a transmitter computing device, the correcting including:
ordering said numerical data in blocks each comprising a definite number of data packets;
generating for each of said blocks a respective set of error-correction packets comprising a respective number of correction packets, said respective number identifying a level of redundancy for correcting the errors;

modifying dynamically said level of redundancy according to characteristics of bursts and of correct-reception intervals between two of said bursts;

detecting a delayed arrival of said packets at the transmission end, rejecting packets affected by delayed arrival; and counting as lost the packets rejected on account of delayed arrival.

14. A method, comprising:

correcting burst errors in a transmission of numerical data in a communications network that includes a transmitter computing device, the correcting including:

ordering said numerical data in blocks each comprising a definite number of data packets;

generating for each of said blocks a respective set of error-correction packets comprising a respective number of correction packets, said respective number identifying a level of redundancy for correcting the errors;

modifying dynamically said level of redundancy according to characteristics of bursts and of correct-reception intervals between two of said bursts; and subjecting said data packets to interleaving.

15. A system for correcting burst errors in the transmission of numerical data on a transmission channel affected by burst errors, the system comprising:

ordering means for ordering said numerical data in blocks each comprising a definite number of data packets;

generating means for generating for each of said blocks a respective set of error-correction packets comprising a respective number of correction packets, said respective number identifying a level of redundancy for correcting the errors; and modifying means for modifying dynamically said level of redundancy according to characteristics of bursts and of correct-reception intervals between two of said bursts, wherein the modifying means include means for modifying dynamically said level of redundancy according to at least one parameter chosen between:

a density of said bursts, defined as fraction of lost or rejected data packets during the bursts; and a density of said correct-reception intervals, defined as fraction of lost or rejected data packets within correct-reception intervals between successive bursts.

16. A system for correcting burst errors in the transmission of numerical data on a transmission channel affected by burst errors, the system comprising:

ordering means for ordering said numerical data in blocks each comprising a definite number of data packets;

generating means for generating for each of said blocks a respective set of error-correction packets comprising a respective number of correction packets, said respective number identifying a level of redundancy for correcting the errors; and modifying means for modifying dynamically said level of redundancy according to characteristics of bursts and of correct-reception intervals between two of said bursts, wherein the modifying means include means for modifying dynamically said level of redundancy according to a packet error rate, defined as a ratio between a total number of lost packets and a total number of expected packets for transmission in a given time interval.

17. The system according to claim 16, further comprising:

further generating means for generating, at time intervals, transmission reports of said packets; and means for detecting a difference in a cumulative number of lost packets as a number of lost packets during one of said time intervals.

18. The system according to claim 16, further comprising:

further generating means for generating, at time intervals, transmission reports of said packets; and means for detecting a difference in progressive numbers between the last packets of two successive reports as the number of expected packets during the interval.

19. A communications network, comprising:

at least one channel for transmission of numerical data affected by burst errors; and a system for correcting the burst errors, the system including:

ordering means for ordering said numerical data in blocks each comprising a definite number of data packets;

generating means for generating for each of said blocks a respective set of error-correction packets comprising a respective number of correction packets, said respective number identifying a level of redundancy for correcting the errors; and modifying means for modifying dynamically said level of redundancy according to characteristics of bursts and of correct-reception intervals between two of said bursts, wherein the modifying means include means for modifying dynamically said level of redundancy according to at least one parameter chosen between;

a density of said bursts, defined as fraction of lost or rejected data packets during the bursts; and a density of said correct-reception intervals, defined as fraction of lost or rejected data packets within correct-reception intervals between successive bursts.

20. The network according to claim 19, in the form of a wireless local-area network.

21. A communication network, comprising:

at least one channel for transmission of numerical data affected by burst errors; and a system for correcting the burst errors, the system including:

ordering means for ordering said numerical data in blocks each comprising a definite number of data packets;

generating means for generating for each of said blocks a respective set of error-correction packets comprising a respective number of correction packets, said respective number identifying a level of redundancy for correcting the errors; and modifying means for modifying dynamically said level of redundancy according to characteristics of bursts and of correct-reception intervals between two of said bursts, wherein the modifying means include means for modifying dynamically said level of redundancy according to a packet error rate, defined as a ratio between a total number of lost packets and a total number of expected packets for transmission in a given time interval.

22. The network according to claim 21, further comprising:

further generating means for generating, at time intervals, transmission reports of said packets; and means for detecting a difference in a cumulative number of lost packets as a number of lost packets during one of said time intervals.

23. The network according to claim 21, further comprising:

further generating means for generating, at time intervals, transmission reports of said packets; and means for detecting a difference in progressive numbers between the last packets of two successive reports as the number of expected packets during the interval.

24. A computer-readable medium having contents that cause a computing device to correct burst errors in a transmission of numerical data according to a method comprising the operations of:

ordering said numerical data in blocks each comprising a definite number of data packets;

generating for each of said blocks a respective set of error-correction packets comprising a respective number of correction packets, said respective number identifying a level of redundancy for correcting the errors; and modifying dynamically said level of redundancy according to characteristics of bursts and of correct-reception intervals between two of said bursts, wherein the modifying operation includes modifying dynamically said level of redundancy according to at least one parameter chosen between;

a density of said bursts, defined as fraction of lost or rejected data packets during the bursts; and a density of said correct-reception intervals, defined as fraction of lost or rejected data packets within correct-reception intervals between successive bursts.

25. The computer-readable medium according to claim 24, further comprising generating said set of error-correction packets as set of forward-error correction packets.

26. A computer-readable medium having contents that cause a computing device to correct burst errors in a transmission of numerical data according to a method comprising the operations of:

ordering said numerical data in blocks each comprising a definite number of data packets;

generating for each of said blocks a respective set of error-correction packets comprising a respective number of correction packets, said respective number identifying a level of redundancy for correcting the errors; and modifying dynamically said level of redundancy according to characteristics of bursts and of correct-reception intervals between two of said bursts, wherein the modifying operation includes modifying dynamically said level of redundancy according to a packet error rate, defined as a ratio between a total number of lost packets and a total number of expected packets for transmission in a given time interval.

27. The computer-readable medium according to claim 26, wherein the method further comprises:

generating, at time intervals, transmission reports of said packets; and detecting a difference in a cumulative number of lost packets as a number of lost packets during one of said time intervals.

28. The computer-readable medium according to claim 26, wherein the method further comprises:

generating, at time intervals, transmission reports of said packets; and detecting a difference in progressive numbers between the last packets of two successive reports as the number of expected packets during the interval.

29. A computer-readable medium having contents that cause a computing device to correct burst errors in a transmission of numerical data according to a method comprising the operations of:

ordering said numerical data in blocks each comprising a definite number of data packets;

generating for each of said blocks a respective set of error-correction packets comprising a respective number of correction packets, said respective number identifying a level of redundancy for correcting the errors;

modifying dynamically said level of redundancy according to characteristics of bursts and of correct-reception intervals between two of said bursts;

identifying said bursts as sequences of packets having the following characteristics:

i) they start with a lost packet or rejected packet;

ii) they do not contain any occurrence of a given number of consecutively received packets;

iii) they conclude with a lost packet or rejected packet; and determining said definite number of data packets as a sum of a mean length of said bursts and of said given number of consecutively received packets minus a mean number of losses of packets in a burst, so that said respective number of correction packets is adjusted based on said mean number of losses of packets in a burst.

30. The computer-readable medium according to claim 24, wherein the method further comprises determining said respective number of correction packets in a way proportional to a packet error rate.

31. The computer-readable medium according to claim 30, further comprising determining said respective number of correction packets according to the following rules;

when the packet error rate is lower than a given threshold, error-correction packets are not added;

when the packet error rate is comprised between two percentage values A and B, with B>A, in a block of n packets, B % error-correction packets are added.

* * * * *

UNITED STATES PATENT AND TRADEMARK OFFICE
CERTIFICATE OF CORRECTION

PATENT NO. : 7,698,618 B2
APPLICATION NO. : 11/397330
DATED : April 13, 2010
INVENTOR(S) : Silvio Lucio Oliva et al.

It is certified that error appears in the above-identified patent and that said Letters Patent is hereby corrected as shown below:

Column 14
Line 35, "The computer-readable medium according to claim 24," should read,
--The computer-readable medium according to claim 29--.

Signed and Sealed this

Twenty-first Day of December, 2010

David J. Kappos
*Director of the United States Patent and Trademark Office*